(12) United States Patent
Weiner

(10) Patent No.: US 6,476,519 B1
(45) Date of Patent: Nov. 5, 2002

(54) POWER BACK-UP UNIT WITH LOW VOLTAGE DISCONNECTS THAT PROVIDE LOAD SHEDDING

(75) Inventor: David A. Weiner, Newnan, GA (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/543,483

(22) Filed: Apr. 6, 2000

(51) Int. Cl.$^7$ .................................................. H02J 7/00
(52) U.S. Cl. .............................. 307/66; 307/29; 307/23; 307/39
(58) Field of Search .............................. 307/64–66, 23, 307/29, 39, 87; 713/320–324, 330, 340; 365/226–229

(56) References Cited

U.S. PATENT DOCUMENTS

| | | | | |
|---|---|---|---|---|
| 4,611,289 A | * | 9/1986 | Coppola ...................... 713/340 |
| 5,160,851 A | * | 11/1992 | McAndrews ................. 307/66 |
| 5,381,554 A | * | 1/1995 | Langer et al. ............... 307/66 |
| 5,387,820 A | * | 2/1995 | Imagawa ...................... 307/39 |
| 5,534,734 A | * | 7/1996 | Pugh et al. ................... 307/39 |
| 5,679,985 A | * | 10/1997 | Brailey et al. ................ 307/29 |
| 5,761,084 A | * | 6/1998 | Edwards ...................... 307/23 |
| 5,793,124 A | * | 8/1998 | Mitzaki ....................... 307/66 |
| 5,923,099 A | * | 7/1999 | Bilir ............................ 307/64 |
| 5,936,318 A | * | 8/1999 | Weiler et al. ................. 307/66 |
| 5,959,368 A | * | 9/1999 | Kubo et al. .................. 307/23 |
| 5,969,436 A | | 10/1999 | Chalasani et al. |
| 5,978,237 A | | 11/1999 | Savage |
| 6,064,125 A | * | 5/2000 | Stendardo et al. ............ 307/64 |

\* cited by examiner

*Primary Examiner*—Fritz Fleming
(74) *Attorney, Agent, or Firm*—Jones, Day, Reavis & Pogue

(57) ABSTRACT

A power back-up unit is provided which includes a primary power source that is connected to a plurality of loads, including a critical load and a non-critical load. A secondary power source is also provided. A first low voltage disconnect is electrically connected to the secondary power source and the critical load. A second low voltage disconnect is electrically connected to the secondary power source and the non-critical load. In one embodiment, the second low voltage disconnect disconnects the non-critical load upon loss of the primary power source. In another embodiment, the second low voltage disconnect has a voltage threshold that is greater than the voltage threshold of the first low voltage disconnect such that the non-critical load is disconnected by the second low voltage disconnect prior to the critical load being disconnected by the first low voltage disconnect.

38 Claims, 3 Drawing Sheets

POWER BACK-UP UNIT WITH LOW VOLTAGE DISCONNECTS THAT PROVIDE LOAD SHEDDING

FIELD OF THE INVENTION

The present invention relates to power back-up units, and more particularly to a power back-up unit with low voltage disconnects that disconnect or shed one load while maintaining power to a second load.

BACKGROUND OF THE INVENTION

Telecommunications, cable television, power distribution equipment and the like are all attached to various electrical loads such as telephones, televisions, appliances, etc. During normal operation these loads are supplied with ac power. These loads can also be connected to a secondary power source such as a battery or generator. This secondary power source is employed to provide reserve energy to the electrical loads in the event of a power outage or fault. Power back-up systems are one way to provide reserve energy in the event of a loss of primary power.

Certain of these back-up systems include a connection to an ac power source, a battery, a low voltage disconnect (LVD) and a connection to one or more loads. The battery is generally maintained in a state of readiness, i.e., fully charged. The battery is generally connected to a rectifier that converts the incoming ac power to DC power. The load(s) are connected to the battery and the rectifier; however, the rectifier normally supplies power to the electrical load(s). If, however, the DC power from the rectifier is interrupted (e.g., by a loss of ac power or a rectifier malfunction), then the secondary power source (e.g., battery) will supply power to the load. The uninterrupted supply of power is an important consideration in the design of lifeline support systems. Even though commercial ac power is typically available about 99.9% of the time, reserve power is required for uninterruptable systems. Power can be disrupted, for example, due to severe weather or an equipment failure. This interruption causes the electrical load(s) to either shut down or switch to a secondary power source. In systems where the electrical loads switch to battery power, one or more of the loads can drain the reserve battery before the ac power is restored. However, it is highly undesirable to allow a battery to discharge completely because, if this happens, it becomes impractical to recharge the battery. Thus, the battery is usually discarded. It is far better to only partially discharge a battery so as not to completely drain the battery and permanently damage it. Therefore, certain prior battery back-up units provide a low voltage disconnect (LVD) that monitors the output voltage of the battery and, when that output voltage drops below a set threshold, disconnects the load(s) from the battery to prevent draining the battery to the point where the battery is permanently damaged.

However, these prior battery back-up units are deficient in a number of ways. For example, when one or more loads drain a battery beyond the set threshold of a prior battery back-up unit before the ac power is restored, the LVD disconnects all of the loads from the battery thereby shutting down all of the loads. This is unacceptable where one of the loads is a critical load such as a lifeline support system. A lifeline support system can include plain-old-telephone-service (POTS). Typically, every home and business has a primary telephone line that provides 911 emergency service. Accordingly, there is a need for a load voltage disconnect (LVD) that allows a critical load (such as a lifeline support system) to maintain its connection with a secondary power source while disconnecting one or more non-critical loads (such as an asymmetrical digital subscriber line (ADSL) system) from the secondary power source so as to prolong the time period that the secondary power source can operate the critical load.

SUMMARY OF THE INVENTION

A power back-up unit is provided which includes a primary power source that is connected to a plurality of loads, including a critical load and a non-critical load. A secondary power source is also provided. A first low voltage disconnect is electrically connected to the secondary power source and the critical load. A second low voltage disconnect is electrically connected to the secondary power source and the non-critical load. In one embodiment, the second low voltage disconnect disconnects the non-critical load upon loss of the primary power source. In another embodiment, the second low voltage disconnect has a voltage threshold that is greater than the voltage threshold of the first low voltage disconnect such that the non-critical load is disconnected by the second low voltage disconnect prior to the critical load being disconnected by the first low voltage disconnect.

Additional novel features and advantages of the present invention will be set forth in part a in the description that follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

The organization and manner of operation of the invention, together with further objects and advantages thereof, may best be understood by reference to the following description taken in connection with the accompanying drawings in which like reference numerals identify like elements, and in which.

DETAILED DESCRIPTION OF THE INVENTION

Figure 1:
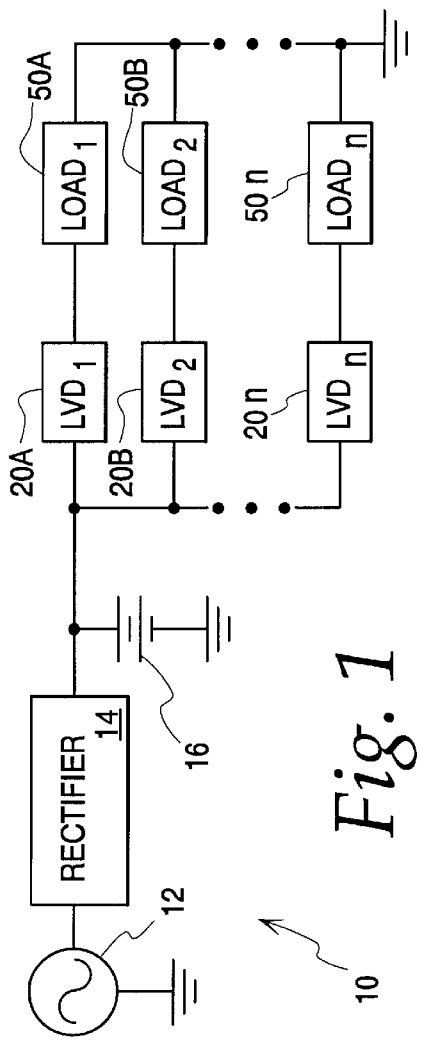
FIG. 1 is a functional diagram of a power back-up unit including LVD's according to one embodiment of the present invention.

Referring now to the drawings, a power back-up unit 10 according to one embodiment of the invention includes a primary power source 12, a rectifier 14, a secondary power source 16, two or more LVD's 20A, 20B, ..., 20n and two or more respective loads 50A, 50B, ..., 50n. Typically, the primary power source 12 is an ac power source and the secondary power source 16 is a battery, or string of batteries. However, one skilled in the art would recognize that the secondary power source 16 could include any type of alternative power source such as, for example, a DC generator. Similarly, the primary power source 12 could include any type of power source such as, for example, an ac generator. The primary power source 12 is electrically connected to each of the loads 50A–50n. The plurality of loads 50A–50n include a critical load and a non-critical load. The first low voltage disconnect 20A is electrically connected to the secondary power source 16 and one or more of the critical loads which, for purposes of this description will be identified as load 50A. The first low voltage disconnect 20A has a first voltage threshold. The second low voltage disconnect 20B is electrically connected to the secondary power source 16 and one or more of the non-critical loads which, for purposes of this description, will be identified as load 50B. The second low voltage disconnect 20B has a second voltage threshold. In one embodiment, the first voltage threshold is about 42 volts and the second voltage threshold is about 49 volts.

In one embodiment, the secondary power source 16 comprises a battery. In this embodiment, the battery is maintained in a state of readiness, i.e., fully charged. The secondary power source 16 is connected in parallel with the rectifier 14 which converts the incoming ac power to DC power. In addition, the rectifier 14 acts as a battery charger that keeps the secondary power source 16 fully charged during normal operation. The output voltage of the rectifier 14 is selected to be slightly greater than the voltage of the secondary power source 16. This ensures that the rectifier 14, not the secondary power source 16, normally supplies power to the electrical loads 50A–50n. If, however, the DC power from the rectifier 14 is interrupted (e.g., by a loss of ac power or a rectifier malfunction), then the secondary power source 16 (in this embodiment a battery) will supply power to the loads 50A–50n. Therefore, the power back-up unit 10 provides an uninterrupted supply of power to the loads 50A–50n. Because the second voltage threshold is greater than the first voltage threshold, as the loads begin to drain the secondary power source (or reserve power), the non-critical load 50B is disconnected by the second low voltage disconnect 20B prior to time when the critical load 50A is disconnected by the first low voltage disconnect.

Thus, by setting the two voltage thresholds at two different voltage levels, the claimed power back-up unit 10 extends the battery reserve time for the critical load 50A. This is accomplished by having the second low voltage disconnect 20B disconnect the non-critical load 50B at a higher battery voltage than the voltage at which the critical load 50A is disconnected by the first low voltage disconnect 20A. Upon loss of the primary power source 12, disconnecting all the loads except the critical load 50A reduces the drain on the secondary power source 16 which thereby extends the time the critical load 50A will have reserve power.

Figure 2:
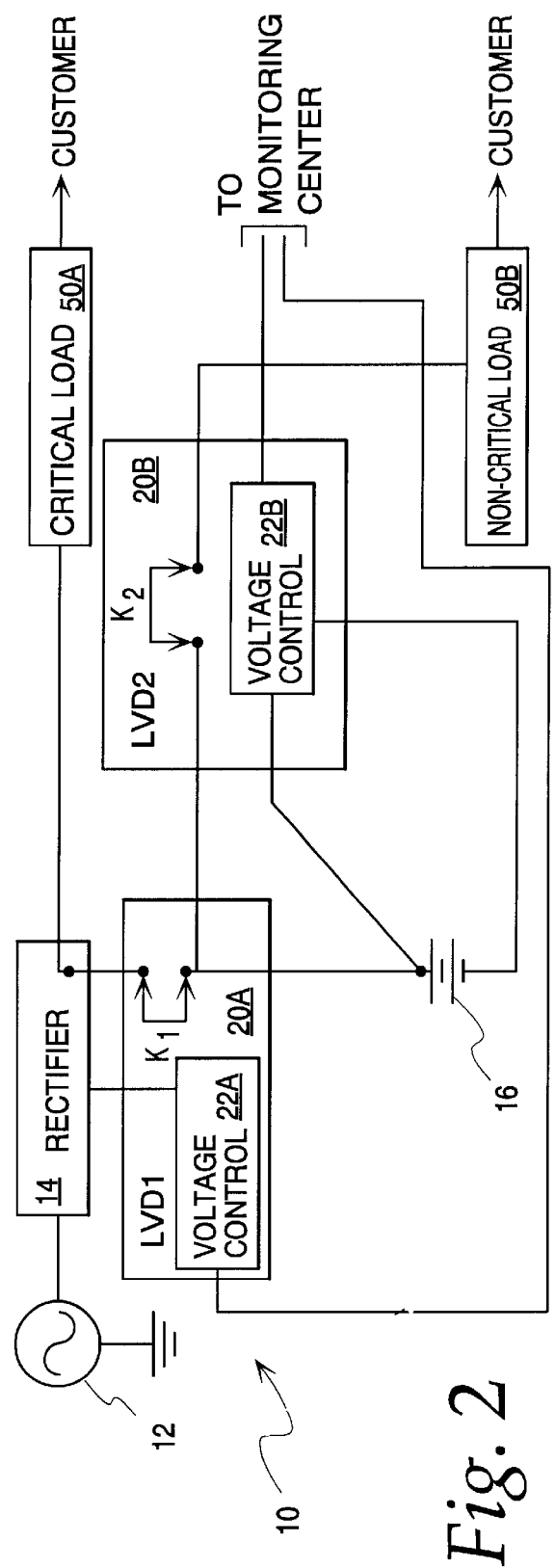
FIG. 2 is a functional diagram of another power back-up unit including LVD's according to another embodiment of the present invention.

Referring now to FIG. 2, there is shown another embodiment of the power back-up unit 10. In this embodiment, the first low voltage disconnect 20A is connected between the rectifier 14 and the secondary power source 16. The second low voltage disconnect 20B is connected between the first low voltage 20A disconnect and the non-critical load 50B. The critical load 50A is connected directly to the rectifier 14. Therefore, in this embodiment, the second low voltage disconnect 20B acts as a load disconnect while the first low voltage disconnect 20A acts as a secondary power source disconnect. However, the results are the same as the embodiment of FIG. 1. Upon loss of the primary power source 12, the voltage of the secondary power source 16 will begin to drop. When the voltage drops below the second voltage threshold, the second low voltage disconnect 20B opens its relay K2, thereby disconnecting the non-critical load 50B. When the voltage of the secondary power source 16 drops below the first voltage threshold, the first low voltage disconnect 20A opens its relay K1 thereby disconnecting the secondary power source 16 which thus disconnects the power to the critical load 50A.

This figure shows that the first low voltage disconnect 20A includes a first voltage control circuit 22A that monitors the output voltage of the rectifier 14. The second low voltage disconnect 20B includes a second voltage control circuit 22B that monitors the voltage of the secondary power source 16. In this embodiment, the second low voltage disconnect 20B disconnects the non-critical load 50B from the secondary power source 16 once the voltage of the secondary power source 16 is less than the second voltage threshold. If during the time the non-critical load is disconnected, the primary power source 12 is restored, the voltage of the secondary power source 16 will begin to increase as the rectifier 14 recharges the secondary power source (e.g., a battery string). When the voltage of the rectifier 14 is greater than a third voltage threshold, as determined by the first voltage control 22A, the second low voltage disconnect 20B reconnects the non-critical load 50B to the primary power source 12 by, for example, closing the relay K2 or a solid state switch. In another embodiment, the second low voltage disconnect 20B reconnects the non-critical load 50B to the primary power source 12 when the voltage of the secondary power source 16 is greater than a third voltage threshold, as determined by the second voltage control 22B. If, instead, during the time the non-critical load is disconnected, the primary power source 12 is not restored, the voltage of the secondary power source 16 will continue to drop. Thus, when the voltage of the secondary power source 16 drops below the first voltage threshold, the first low voltage disconnect 20A disconnects the secondary power source 16 thereby disconnecting the power to the critical load 50A. Then, when the primary power source 12 is restored, the critical load 50A will be supplied power from the rectifier 14. When the output voltage of the rectifier 14 is greater than a fourth voltage threshold, as determined by the first voltage control 22A, the first low voltage disconnect 20A reconnects the secondary power source 16 to the rectifier 14 by, for example, closing the relay K1 or a solid state switch. Thus, the voltage of the secondary power source 16 will begin to increase as the rectifier 14 recharges the secondary power source 16. In one embodiment, the third voltage threshold is 52 volts and the fourth voltage threshold is 49 volts. The first, second, third and fourth voltage thresholds are adjustable.

In another embodiment, the second low voltage disconnect 20B disconnects the non-critical load 50B upon loss of the primary power source 12. In other words, the voltage control circuit 22A monitors the output voltage of the rectifier 14. When that voltage drops below a predetermined threshold, the voltage control circuit 22A indicates that a loss of primary power has occurred. The second low voltage disconnect 20B then opens its relay K2 to disconnect the non-critical load 50B.

Figure 3:
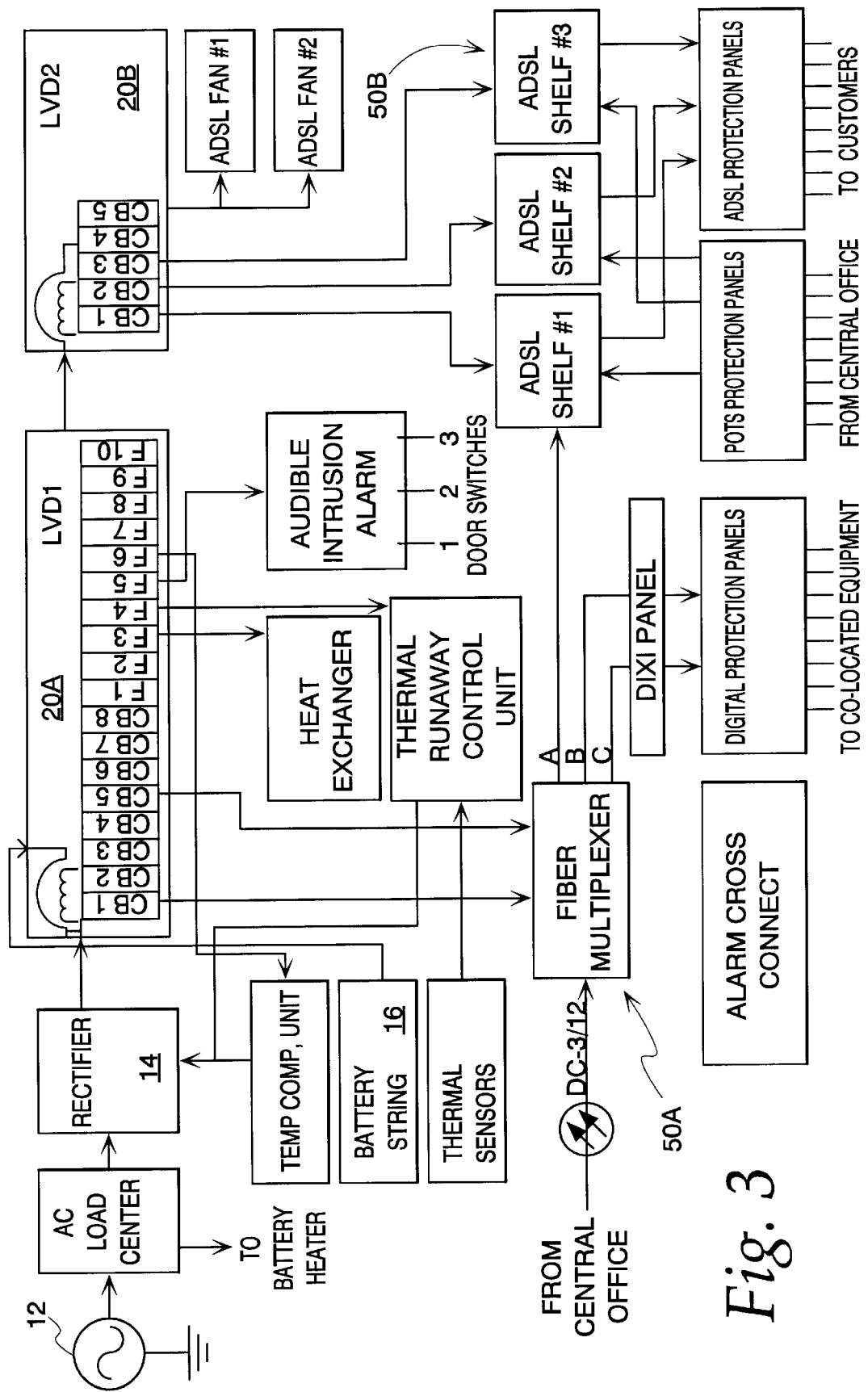
FIG. 3 is a functional diagram of still another power back-up unit including LVD's according to a further embodiment of the present invention.

Referring now to FIG. 3, there is shown a circuit that includes the first and second LVD's 20A and 20B. In this more detailed embodiment, the plurality of loads are shown as elements of a communications systems. This system includes non-critical loads 50B which comprise an asymmetrical digital subscriber line (ADSL) system. This system further includes critical loads 50A which comprise a lifeline support system. The illustrated secondary power source 16 includes a string of batteries. These batteries function the same as the singular secondary power source 16 described above. Similar to the embodiments described above, the second low voltage disconnect 20B disconnects the non-critical loads 50B from the secondary power source 16 once the voltage of the secondary power source 16 is less than the second voltage threshold. If during the time the non-critical loads are disconnected, the primary power source 12 is not restored, the voltage of the secondary power source 16 will continue to drop. Thus, when the voltage of the secondary power source 16 drops below the first voltage threshold, the first low voltage disconnect 20A disconnects the secondary power source 16 thereby disconnecting the power to the critical loads 50A.

Figure 4:
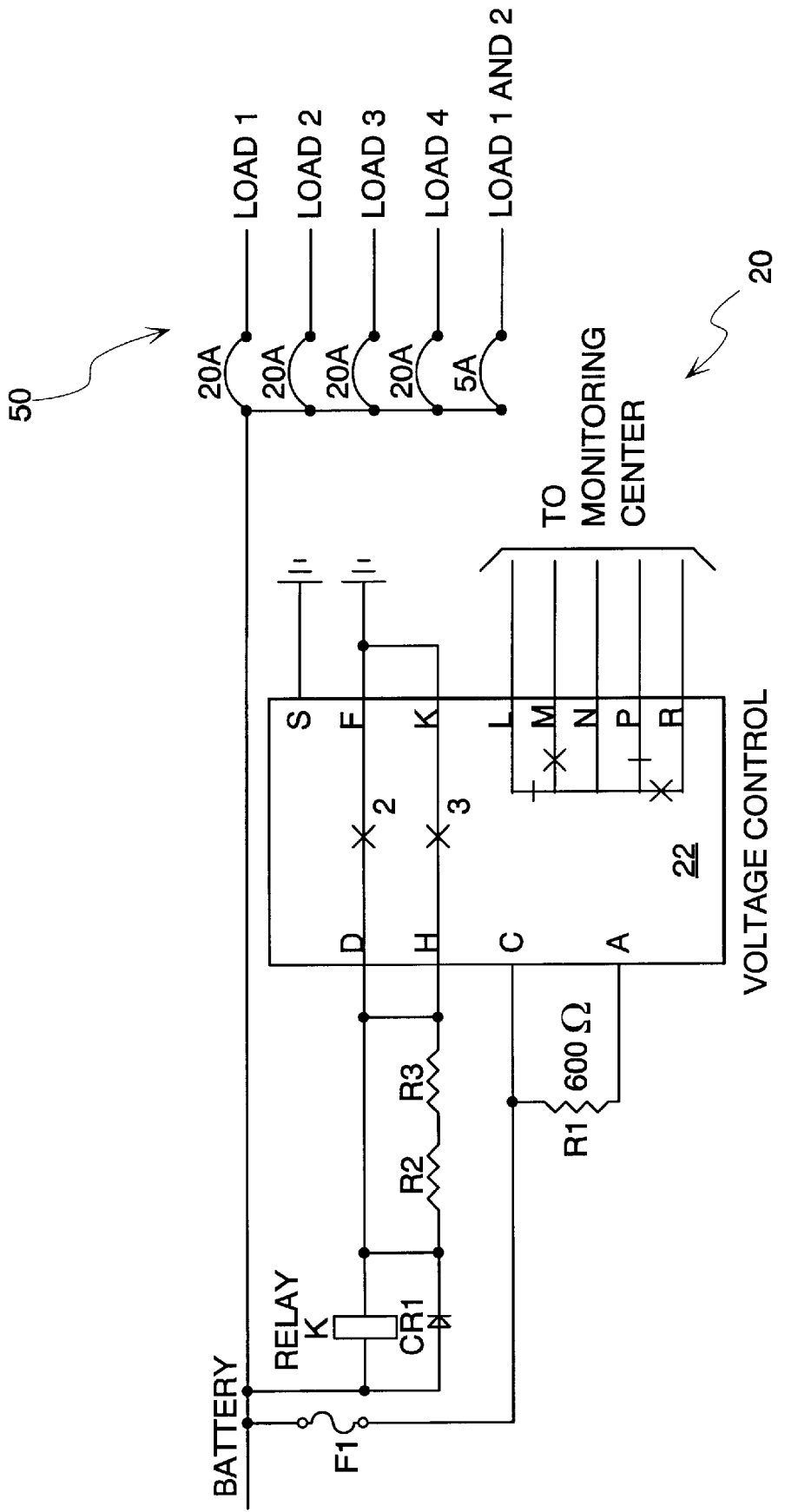
FIG. 4 is a functional diagram of a LVD circuit according to one embodiment of the present invention.

Referring now to FIG. 4, there is shown one embodiment of a low voltage disconnect 20. This circuit includes a connection to the secondary power source 16, connections to the loads 50, a relay K, a voltage control circuit 22 and various resistors and fuses. The voltage control circuit 22 monitors the voltage of a component connected thereto. In the illustrated embodiment, since the voltage control circuit 22 is connected to the secondary power source 16, it is this voltage that will be monitored. In another embodiment, the voltage control circuit 22 is connected to the rectifier 14 so that the output voltage of that component can be monitored. When the monitored voltage crosses a predetermined, adjustable threshold, the voltage control circuit 22 sends a signal indicating that event. For example, where the voltage of the secondary power source 16 is monitored and drops below the second voltage threshold, a signal is sent to the second low voltage disconnect 20B which then disconnects the non-critical load 50B.

In another embodiment, the low voltage disconnect 20 includes multiple relays or switches, each with a corresponding voltage threshold. In this embodiment, one low voltage disconnect 20 could be connected to two or more loads, including a critical load and a non-critical load. Similar to the power back-up unit embodiments described above, the low voltage disconnect 20 would disconnect the non-critical load once the voltage of the secondary power source 16 drops below the second voltage threshold. Then, after the critical load drains the secondary power source 16 to the point where its voltage drops below the first voltage threshold, the low voltage disconnect 20 would disconnect the critical load.

Therefore, one of the advantages of the present invention is that the reserve time for the claimed power back-up unit 10 is extended. Another advantage is that the way the reserve time is extended is determined by the needs of the user. For example, if, for a particular application, it is easier to trigger a non-critical load disconnect by monitoring the voltage of the secondary power source 16, then this is the event that will trigger shedding of the non-critical load(s). In this embodiment, the voltage thresholds are adjustable to suit differing environments. If, for another application, it is easier to trigger a non-critical load disconnect by monitoring the voltage of the rectifier (or the primary power source), then a different event, loss of primary power, will trigger shedding of the non-critical load(s). In either of these embodiments, the time the critical load(s) are supplied with reserve power is greater than if only a single event or single voltage threshold were used to disconnect all the loads.

While particular embodiments of the invention have been shown and described in detail, it will be obvious to those skilled in the art that changes and modifications of the present invention, in its various embodiments, may be made without departing from the spirit and scope of the invention because these modifications and changes would be matters of routine engineering or design. As such, the scope of the invention should not be limited by the particular embodiments and specific constructions described herein but should be defined by the appended claims and equivalents thereof.

What is claimed is:

1. A power back-up unit, comprising:
   a primary power source connected to a plurality of loads including a critical load and a non-critical load;
   a secondary power source;
   a first low voltage disconnect electrically connected to the secondary power source and the critical load, the first low voltage disconnect having a first voltage threshold;
   a second low voltage disconnect electrically connected to the secondary power source and the non-critical load, the second low voltage disconnect having a second voltage threshold that is greater than the first voltage threshold such that the non-critical load is disconnected by the second low voltage disconnect prior to the critical load being disconnected by the first low voltage disconnect, the second low voltage disconnect being external to the first low voltage disconnect; and
   a first voltage control circuit, internal to the second low voltage disconnect, that monitors the voltage of the secondary power source and controls the second low voltage disconnect.

2. The power back-up unit of claim 1, wherein the secondary power source includes one or more batteries.

3. The power back-up unit of claim 1, wherein the first voltage threshold is about 42 volts.

4. The power back-up unit of claim 1, wherein the second voltage threshold is about 49 volts.

5. The power back-up unit of claim 1, wherein the second low voltage disconnect disconnects the non-critical load from the secondary power source once the voltage of the secondary power source is less than the second voltage threshold.

6. The power back-up unit of claim 5, further including a voltage control circuit having a third voltage threshold, wherein the non-critical load is electrically reconnected to the primary power source once the voltage of the primary power source is greater than the third voltage threshold.

7. The power back-up unit of claim 1, wherein the first low voltage disconnect disconnects the critical load from the secondary power source once the voltage of the secondary power source is less than the first voltage threshold.

8. The power back-up unit of claim 7, further including a voltage control circuit having a fourth voltage threshold, wherein the secondary power source is electrically reconnected to the primary power source once the voltage of the primary power source is greater than the fourth voltage threshold.

9. The power back-up unit of claim 1, wherein the second low voltage disconnect includes a solid state switch.

10. The power back-up unit of claim 1, wherein the second low voltage disconnect includes a relay.

11. The power back-up unit of claim 1, wherein the first low voltage disconnect includes a relay.

12. The power back-up unit of claim 1, wherein the second low voltage disconnect includes a voltage control circuit that monitors the voltage of the secondary power source.

13. The power back-up unit of claim 1, wherein the first low voltage disconnect includes a voltage control circuit that monitors the voltage of the primary power source.

14. The power back-up unit of claim 13, wherein the second low voltage disconnect disconnects the non-critical load upon loss of the primary power source.

15. The power back-up unit of claim 1, wherein the first and second voltage thresholds are adjustable.

16. The power back-up unit of claim 1, wherein the non-critical load is an asymmetrical digital subscriber line (ADSL) system.

17. The power back-up unit of claim 1, wherein the critical load is a lifeline support system.

18. The power back-up unit of claim 1, further including a second voltage control circuit that monitors the voltage of the secondary power source and controls the first low voltage disconnect.

19. The power back-up unit of claim 18, wherein the second voltage control circuit sends a signal to the first low voltage disconnect indicating that the secondary power source voltage is less than the first voltage threshold.

20. The power back-up unit of claim 1, wherein the first voltage control circuit sends a signal to the second low voltage disconnect indicating that the secondary power source voltage is less than the second voltage threshold.

21. A method of extending the length of time a power back-up unit can supply a critical load with power, the method comprising:
    providing a first low voltage disconnect with a first voltage threshold;
    electrically connecting the first low voltage disconnect to a critical load;
    providing a second low voltage disconnect with a second voltage threshold, the second low voltage disconnect being external to the first low voltage disconnect;
    electrically connecting the second low voltage disconnect to a non-critical load;
    selecting the second voltage threshold such that it is greater than the first voltage threshold;
    disconnecting the non-critical load via the second low voltage disconnect prior to disconnecting the critical load via the first low voltage disconnect; and
    monitoring the voltage of the secondary power source and controlling the second low voltage disconnect via a first voltage control circuit internal to the second low voltage disconnect.

22. The method of claim 21, further including monitoring the voltage of the secondary power source.

23. The method of claim 21, further including monitoring the voltage of the primary power source.

24. The method of claim 21, wherein the first and second voltage thresholds are adjustable.

25. The method of claim 21, further including disconnecting the non-critical load from the secondary power source via the second low voltage disconnect once the voltage of the secondary power source is less than the second voltage threshold.

26. The method of claim 25, further including providing a voltage control circuit having a third voltage threshold, and reconnecting the non-critical load to the primary power source once the voltage of the primary power source is greater than the third voltage threshold.

27. The method of claim 21, further including disconnecting the critical load from the secondary power source via the first low voltage disconnect once the voltage of the secondary power source is less than the first voltage threshold.

28. The method of claim 27, further including providing a voltage control circuit having a fourth voltage threshold, and reconnecting the critical load to the primary power source once the voltage of the primary power source is greater than the fourth voltage threshold.

29. The method of claim 21, further including disconnecting the non-critical load via the second low voltage disconnect upon loss of the primary power source.

30. The method of claim 21, further including monitoring the voltage of the secondary power source and controlling the first low voltage disconnect via a second internal voltage control circuit.

31. The method of claim 30, wherein the second internal voltage control circuit sends a signal to the first low voltage disconnect indicating that the secondary power source voltage is less than the first voltage threshold.

32. The method of claim 21, wherein the first internal voltage control circuit sends a signal to the second low voltage disconnect indicating that the secondary power source voltage is less than the second voltage threshold.

33. A power back-up unit, comprising:
    a primary power source connected to a plurality of loads including a critical load and a non-critical load;
    a secondary power source;
    a first low voltage disconnect electrically connected to the secondary power source and the critical load;
    a second low voltage disconnect electrically connected to the secondary power source and the non-critical load, the second low voltage disconnect disconnecting the non-critical load upon loss of the primary power source, the second low voltage disconnect being external to the first low voltage disconnect; and
    a first voltage control circuit, internal to the first low voltage disconnect, that monitors the voltage of the primary power source and controls the second low voltage disconnect.

34. The power back-up unit of claim 33, wherein the second low voltage disconnect includes a relay.

35. The power back-up unit of claim 33, wherein one of the first and second low voltage disconnects includes a voltage control circuit that monitors the voltage of the primary power source.

36. The power back-up unit of claim 35, wherein the voltage control circuit detects the loss of the primary power source.

37. The power back-up unit of claim 33, further including a second voltage control circuit that monitors the voltage of the secondary power source and controls the second low voltage disconnect.

38. The power back-up unit of claim 37, wherein the second voltage control circuit sends a signal to the second low voltage disconnect indicating that the secondary power source voltage is less than a preset voltage threshold.

* * * * *